United States Patent
Murai et al.

(10) Patent No.: US 9,159,272 B2
(45) Date of Patent: Oct. 13, 2015

(54) LIGHT EMITTING DEVICE FOR IMAGE DISPLAY, IMAGE DISPLAY APPARATUS, AND LED DRIVER

(75) Inventors: Takayuki Murai, Osaka (JP); Kohji Fujiwara, Osaka (JP); Tomohiko Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 383 days.

(21) Appl. No.: 13/522,107

(22) PCT Filed: Nov. 16, 2010

(86) PCT No.: PCT/JP2010/070336
§ 371 (c)(1),
(2), (4) Date: Jul. 13, 2012

(87) PCT Pub. No.: WO2011/104952
PCT Pub. Date: Sep. 1, 2011

(65) Prior Publication Data
US 2012/0299979 A1 Nov. 29, 2012

(30) Foreign Application Priority Data

Feb. 24, 2010 (JP) ................................ 2010-038466

(51) Int. Cl.
*G09G 5/10* (2006.01)
*G09G 3/36* (2006.01)
(Continued)

(52) U.S. Cl.
CPC ............ *G09G 3/3426* (2013.01); *G09G 3/3413* (2013.01); *H05B 33/08* (2013.01);
(Continued)

(58) Field of Classification Search
CPC .................. G09G 2320/0233; G09G 2360/16; G09G 3/342; G09G 3/3426
USPC ......... 345/77, 82, 89, 92, 102, 207, 213, 589, 345/690–691; 315/158; 324/71.1
See application file for complete search history.

(56) References Cited

U.S. PATENT DOCUMENTS 5,686,869 A * 11/1997 Naruse et al. ................. 332/109
2004/0201562 A1* 10/2004 Funamoto et al. .............. 345/89
(Continued)

FOREIGN PATENT DOCUMENTS

JP 08-044314 A 2/1996
JP 2002-108305 A 4/2002
(Continued)

OTHER PUBLICATIONS

Official Communication issued in International Patent Application No. PCT/JP2010/070336, mailed on Feb. 22, 2011.

*Primary Examiner* — Lin Li
(74) *Attorney, Agent, or Firm* — Keating & Bennett, LLP

(57) ABSTRACT

Specifically provided is a light emitting device for image display, wherein each of light emitting elements, a PWM control unit which PWM-controls a current to be supplied to the light emitting element, a control condition setting unit which, according to the APL of image data, determines and updatably sets the PWM limiting condition for limiting the PWM value that is the duty ratio of the PWM control, and the reference current value that is the value of the current flowing to the light emitting element in response to turn-on of the PWM control, and a PWM value calculation unit which on the basis of the image data, the PWM limit condition, and the reference current value, calculates the PWM value of each area, and the PWM control unit performs the PWM control on the basis of the reference current value and the calculated PWM value.

11 Claims, 8 Drawing Sheets

(51) Int. Cl.

| | | |
|---|---|---|
| *G06F 3/033* | (2013.01) | |
| *G09G 5/08* | (2006.01) | |
| *G09G 5/02* | (2006.01) | |
| *G05F 1/00* | (2006.01) | |
| *H05B 37/02* | (2006.01) | |
| *H05B 39/04* | (2006.01) | |
| *H05B 41/36* | (2006.01) | |
| *H01J 7/24* | (2006.01) | |
| *H01J 13/32* | (2006.01) | |
| *G09G 3/34* | (2006.01) | |
| *H05B 33/08* | (2006.01) | |
| *G02F 1/1335* | (2006.01) | |

(52) U.S. Cl.
CPC . *H05B 33/086* (2013.01); *G02F 2001/133601* (2013.01); *G09G 2320/041* (2013.01); *G09G 2320/064* (2013.01); *G09G 2320/0633* (2013.01); *G09G 2320/0646* (2013.01); *G09G 2330/021* (2013.01); *G09G 2330/028* (2013.01); *G09G 2330/045* (2013.01); *G09G 2360/16* (2013.01)

(56) References Cited

U.S. PATENT DOCUMENTS

| | | | |
|---|---|---|---|
| 2005/0184952 A1 | 8/2005 | Konno et al. | |
| 2006/0066533 A1 | 3/2006 | Sato et al. | |
| 2006/0082538 A1 | 4/2006 | Oyama | |
| 2006/0214904 A1 | 9/2006 | Kimura et al. | |
| 2007/0152926 A1 | 7/2007 | Kwon | |
| 2008/0204395 A1* | 8/2008 | Kang et al. | 345/102 |
| 2008/0265865 A1* | 10/2008 | Gurr | 324/71.1 |
| 2008/0278432 A1* | 11/2008 | Ohshima | 345/102 |
| 2009/0009105 A1* | 1/2009 | Sakurai | 315/291 |
| 2009/0284545 A1* | 11/2009 | Watanabe et al. | 345/589 |
| 2010/0020008 A1 | 1/2010 | Kobayashi et al. | |
| 2010/0149224 A1* | 6/2010 | Baba et al. | 345/690 |
| 2010/0194292 A1* | 8/2010 | Hamada | 315/158 |
| 2010/0220047 A1 | 9/2010 | Adachi | 345/102 |
| 2011/0109228 A1* | 5/2011 | Shimomura et al. | 315/113 |
| 2011/0157262 A1 | 6/2011 | Fujiwara et al. | |
| 2011/0175935 A1* | 7/2011 | S et al. | 345/690 |

FOREIGN PATENT DOCUMENTS

| | | | | |
|---|---|---|---|---|
| JP | 2005-258403 A | 9/2005 | | |
| JP | 2006-091681 A | 4/2006 | | |
| JP | 2006-337714 A | 12/2006 | | |
| JP | 2007-034251 A | 2/2007 | | |
| JP | 2007-183608 A | 7/2007 | | |
| JP | 2008-125049 A | 5/2008 | | |
| JP | 2008-186668 A | 8/2008 | | |
| JP | 2008-233830 A | 10/2008 | | |
| WO | WO/2009/063803 | * | 11/2007 | G09G 3/36 |
| WO | 2010/041504 A1 | 4/2010 | | |

* cited by examiner

FIG.5

| 0 (1) | 50 (2) | 50 (3) | 50 (4) | 50 (5) | 0 (6) |
|---|---|---|---|---|---|
| 100 (7) | 100 (8) | 100 (9) | 100 (10) | 100 (11) | 100 (12) |
| 100 (13) | 100 (14) | 100 (15) | 100 (16) | 100 (17) | 100 (18) |
| 0 (19) | 50 (20) | 50 (21) | 50 (22) | 50 (23) | 0 (24) |

FIG.6

| 0 (1) | 37.5 (2) | 37.5 (3) | 37.5 (4) | 37.5 (5) | 0 (6) |
|---|---|---|---|---|---|
| 75 (7) | 75 (8) | 75 (9) | 75 (10) | 75 (11) | 75 (12) |
| 75 (13) | 75 (14) | 75 (15) | 75 (16) | 75 (17) | 75 (18) |
| 0 (19) | 37.5 (20) | 37.5 (21) | 37.5 (22) | 37.5 (23) | 0 (24) |

LIGHT EMITTING DEVICE FOR IMAGE DISPLAY, IMAGE DISPLAY APPARATUS, AND LED DRIVER

TECHNICAL FIELD

The present invention relates to: a light emitting device for image display that emits light for the image display; an image display apparatus that includes the light emitting device; and an LED driver.

BACKGROUND ART

Conventionally, various image display apparatuses such as a liquid crystal display apparatus, a PDP [Plasma Display Panel] and the like are proposed. Generally, an image display apparatus is provided with a light emitting device for image display that emits light which is used for image display. The image display apparatus suitably controls light transmittance and light intensity based on given image data, thereby displaying an image.

For example, a liquid crystal display apparatus includes a backlight unit (which corresponds to a portion of the above light emitting device for image display) and a liquid crystal panel; to display an image, light transmittance of the backlight unit is controlled by the liquid crystal panel. Besides, as such backlight unit, various types are devised.

As an example, a backlight is devised, in which a plate-shaped member disposed to oppose a liquid crystal panel is divided in a plurality of areas (regions) and light emitting elements are disposed on each area. Besides, further, a patent document 1 discloses a type of backlight unit (hereinafter, sometimes called an "area drive type" for the sake of convenience), in which light emitted from light emitting elements disposed in each area is controlled for each area.

According to the image display apparatus disclosed in the patent document 1, brightness of backlight (i.e., light emission power supplied to the light emitting element of the backlight unit) is adjustable for each area based on image data (i.e., the brighter a corresponding image portion is, the brighter light the light emitting element belonging to the area is made to emit), and an image having a high contrast ratio is obtainable.

Here, as the light emitting element, an element, typically, an LED [Light Emitting Diode], which emits light in accordance with a supplied current (brightness of the emitted light changes), is the most common. Besides, consumed power of a backlight unit using such a light emitting element nearly depends on a sum of currents flowing (supplied) in respective light emitting elements when a voltage applied to the light emitting element during a time of light emission is constant.

CITATION LIST

Patent Literature

PLT1: JP-A-2005-258403
PLT2: JP-A-2007-34251

SUMMARY OF INVENTION

Technical Problem

As described above, a backlight unit of the area drive type is applied, whereby the image display apparatus becomes able to display an image that has a high contrast ratio. Here, as a method for controlling the light emission from a light emitting element, there is a method for controlling an electric current (supplied current) supplied to the light emitting element by means of PWM [Pulse Width Modulation] control.

If such a method is employed in a backlight unit of the area drive type that emits light in accordance with the supplied current, it becomes easy to decide a duty ratio for each area and perform adjustment of the supplied current for each area. As described above, the PWM control is preferable as a method for controlling the supplied current in the backlight unit of the area drive type.

In the case where the supplied current is controlled by means of the PWM control, the amount of the supplied current is decided by a product of the value of a reference current (a current flown in each light emitting element in accordance with turning-on of the PWM control) and the duty ratio for the PWM control. In general PWM control, the reference current value is fixed, and the current amount is adjusted via a change in the duty ratio.

Here, usually, from the viewpoint of energy saving and heat generation alleviation, an upper limit is set on the consumed power of the backlight unit. When the supplied current for each area is decided, it is necessary to prevent the consumed power of the backlight unit from exceeding the upper limit. In this point, in the case where the supplied current is controlled by means of the PWM control, it is also possible to decide the supplied current for each area such that the consumed power of the backlight unit does not exceed the upper limit.

As a method for achieving this, there is a method, in which whenever necessary, a ratio of the duty ratios for each area is decided based on image data; and the duty ratio for each area is decided such that the decided ratio is kept and a sum of the duty ratios for respective areas does not exceed a predetermined upper limit value.

The total amount of the supplied currents is nearly expressible as:

(the reference current value)×(the number [fixed value] of LEDs per area)×(the average value of the duty ratios for the respective areas)×(the total number [fixed value] of the areas)=(the reference current value)×(the number [fixed value] of LEDs per area)×(the sum of the duty ratios for the respective areas) (=$I$ sum)

Because of this, it is conceivable that the consumed power of the backlight unit, even considering a change in the voltage applied to the light emitting element, is limited to a value that is obtained by:

$I$ sum (the maximum value [fixed value] of the voltage applied to the light emitting element)

Because of this, when the reference current value is fixed, as in the method, by deciding the upper limit value of the sum of the duty ratios of the respective areas, it is possible to limit the consumed power of the backlight unit. As described above, by setting a PWM limit condition (in this example, the upper limit value of the sum of the duty ratios) that limits the upper limit of the duty ratio, it is possible to prevent the consumed power of the backlight unit from exceeding the upper limit In the meantime, in the case where the supplied current is controlled by means of the PWM control, even in a case where the product of the reference current value and the duty ratio is made constant (i.e., the supplied current is constant), as a matter of fact, light emission efficiency and the like are different when the reference current value is relatively large (the duty ratio becomes relatively small) versus when the reference current value is relatively small (the duty ratio becomes relatively large).

More specifically, generally, even if the product of the reference current value and the duty ratio is constant, when the reference current value is smaller (the duty ratio is larger), the light emission brightness of the light emitting element becomes high. In other words, from the viewpoint of light emission efficiency, usually, it is desirable that the reference current value is set as small as possible.

However, in the case where the reference current value is set small, the peak brightness (the maximum brightness value of the light emitting element) also is alleviated to a small value. Because of this, depending on a situation, it is not invariably desirable that the reference current value is set at a small value.

For example, in a case where the APL [Average Picture Level] of a displayed image is relatively small, even if the brightness of light emitting elements in part of the areas is raised, a problem, in which the consumed power of the backlight unit exceeds the upper limit, is unlikely to occur. Because of this, especially when the APL of the displayed image is relatively small, if it is possible to sufficiently enlarge the reference current value, it is possible to raise the brightness (the peak brightness is high); however, in the case where the reference current value is fixed to a small value, it is hard to take such a measure. Here, for example, if the reference current value is updated to a large value as the APL of the image becomes small, it is possible to raise the peak brightness to a high value.

As described above, in the area type of backlight unit, in the case where the supplied current is controlled by means of the PWM control, it is desirable that the reference current value for the PWM control is flexibly set in accordance with the APL of the image. However, in a case where the above PWM limit condition is set, the reference current value changes, whereby a suitable PWM condition changes. Accordingly, it is sayable desirable that the PWM limit condition also is likewise flexibly set. Here, in the above description, the example is described, in which the light emitting device for image display is the backlight unit; the same thing is likely to become a problem in various devices in which the supplied current is controlled by means of the PWM control.

In light of the above problems, it is an object of the present invention to provide a light emitting device for image display that is a light emitting device of area drive type which controls a current supplied to a light emitting element by means of PWM control and is able to flexibly set a reference current value and a PWM limit condition for the PWM control in accordance with an APL of an image. Besides, it is also an object of the present invention to provide an image display apparatus to which the light emitting device for image display is applied.

Solution to Problem

To achieve the above object, a light emitting device for image display according to the present invention is disposed in an image display apparatus which displays an image based on image data, the light emitting device for image display includes:

a light emitting unit that is divided in a plurality of areas and each of a plurality of light emitting elements for emitting light in accordance with a current supplied is disposed corresponding to each of the areas; and a PWM control portion that applies PWM control to the current supplied to the light emitting element;

the light emitting device for image display uses the light emitting element to emit light that is used for display of the image;

the light emitting device for image display includes:

a control condition setting portion that decides and sets, in an updatable manner, a PWM limit condition for setting a predetermined limitation on a PWM value which is a duty ratio for the PWM control, and a reference current value which is a value of a current that flows the light emitting element in accordance with turning-on of the PWM control; and a PWM value calculation portion that calculates a PWM value for each of the areas based on the image data, the PWM limit condition and the reference current value; wherein the PWM control portion performs the PWM control based on the reference current value and the calculated PWM value.

According to the present structure, the reference current value and the PWM control condition are set in an updatable manner in accordance with the APL of the image data, and based on the image data and the PWM value that is calculated based on the setting, the PWM control is applied to the current supplied to the light emitting element. Because of this, according to the present structure, it becomes possible to control the current supplied to the light emitting element by means of the PWM control and flexibly set the reference current value and the PWM limit condition for the PWM control in accordance with the APL of the image.

Besides, in the above structure, more specifically, a structure may be employed, in which the control condition setting portion decides a limit value, which is an upper limit value of a sum of the PWM values for the respective areas, as the PWM limit condition.

Besides, in the above structure, a structure may be employed, in which the control condition setting portion records beforehand reference information that indicates at least one of a relationship between the APL and the limit value and a relationship between the APL and the reference current value; wherein the control condition setting portion decides the limit value and the reference current value based on the reference information.

According to the present structure, by obeying the reference information, it becomes possible to easily decide the limit value and the reference current value.

Besides, in the above structure, a structure may be employed, in which the control condition setting portion updates setting of the limit value and the reference current value substantially concurrently for one of the image data or for every plurality of frames.

According to the present structure, by avoiding a deviation between update timings of the limit value and the reference current value, it becomes possible to keep matching between both values and alleviate a brightness change in image display as low as possible. In the meantime, the words "substantially concurrently" here means that the timing deviation is within one frame (a period of frame update in display of a moving image).

Besides, in the above structure, a structure may be employed, in which the PWM value calculation portion decides ratios of the PWM values for the respective areas based on the image data; and performs the calculation in accordance with the decided ratios such that the sum of the PWM values does not exceed the limit value.

According to the present structure, even if the current supplied to each light emitting element is limited in accordance with the then-set limit value, it becomes possible to display an image, which has a high contrast ratio, on the image display apparatus. Besides, in the above structure, more specifically, a structure may be employed, in which the the light emitting element is an LED.

Besides, in the above structure, a structure may be employed, in which when deciding the limit value and the reference current value, the control condition setting portion decides a value as well of a voltage to be applied to the LED in accordance with the reference current value; wherein the value of the voltage to be applied to the LED is set at the decided value.

It is known that a value of a voltage required to suitably make an LED emit light changes in accordance with a current flowing in the LED. According to the present structure, even if the change occurs because of update of the reference current value, it becomes possible to suitably deal with it.

Besides, in the above structure, a structure may be employed, in which the light emitting unit is provided with a plurality of the LEDs that emit a plurality of kinds of light colors; and the light emitting device for image display includes a tint correction portion that corrects the reference current value for each of the colors based on at least one of the decided reference current value and a detected temperature.

It is known that a light color (tint) emitted from an LED changes in accordance with a current flowing in the LED and a temperature. According to the present structure, it becomes possible to adjust the light color from the LED disposed in the light emitting unit and correct the change.

Besides, an image display apparatus according to the present invention is structured to display an image by using the light emitted from the light emitting device for image display that has the above structure. According to the image display apparatus, it becomes possible to enjoy an advantage of the light emitting device for image display that has the above structure.

Besides, the image display apparatus according to the present invention is an image display apparatus that includes: a backlight unit; and an LCD panel whose light transmittance is adjusted for each pixel based on the image data; the image display apparatus displays an image on a display region of the LCD panel by giving light from the backlight unit to the LCD panel; wherein a structure is employed, in which the light emitting device for image display having the above structure is used as the backlight unit. According to the image display apparatus, it becomes possible to achieve a liquid crystal display apparatus that uses the light emitting device for image display having the above structure as the backlight unit.

Besides, in the above structure, a structure may be employed, in which the LCD panel is provided with a plurality of kinds of color pixels; the image display apparatus includes a tint correction portion that corrects the light transmittance for each of the colors based on at least one of the actual set reference current value and the detected temperature. According to the present structure, it becomes possible to adjust the light transmittance of the LCD panel and correct a seeming change in the light color (tint) from the LED.

Besides, an LED driver according to the present invention is an LED driver that supplies a current to the plurality of LEDs by means of the PWM control and is able to change duty ratios for the PWM control for one or every plurality of the LEDs; wherein a structure is employed, in which also the reference current value, which is a value of the current flown in the LED, is variable in accordance with turning-on of the PWM control; and a product of a sum of the duty ratios and the reference current value is limited so as not to exceed a predetermined upper limit value.

Advantageous Effects of Invention

As described above, in the light emitting device for image display according to the present invention, the reference current value and the PWM limit condition are set in an updatable manner in accordance with the APL of the image data, and based on the image data and the PWM value that is calculated based on the setting, the PWM control is applied to the current supplied to the light emitting element. Because of this, it becomes possible to control the current supplied to the light emitting element by means of the PWM control and flexibly set the reference current value and the PWM limit condition for the PWM control in accordance with the APL of the image.

Besides, in the image display apparatus according to the present invention, it becomes possible to enjoy an advantage of the light emitting device for image display according to the present invention.

BRIEF DESCRIPTION OF DRAWINGS

FIG. 5 is a description view regarding PWM values corresponding to respective areas.

FIG. 6 is a description view regarding corrected PWM values corresponding to respective areas.

DESCRIPTION OF EMBODIMENTS

An image display apparatus (liquid crystal display apparatus) according to an embodiment of the present invention is described with reference to drawings.

[Structure and the Like of Image Display Apparatus]

Figure 1:
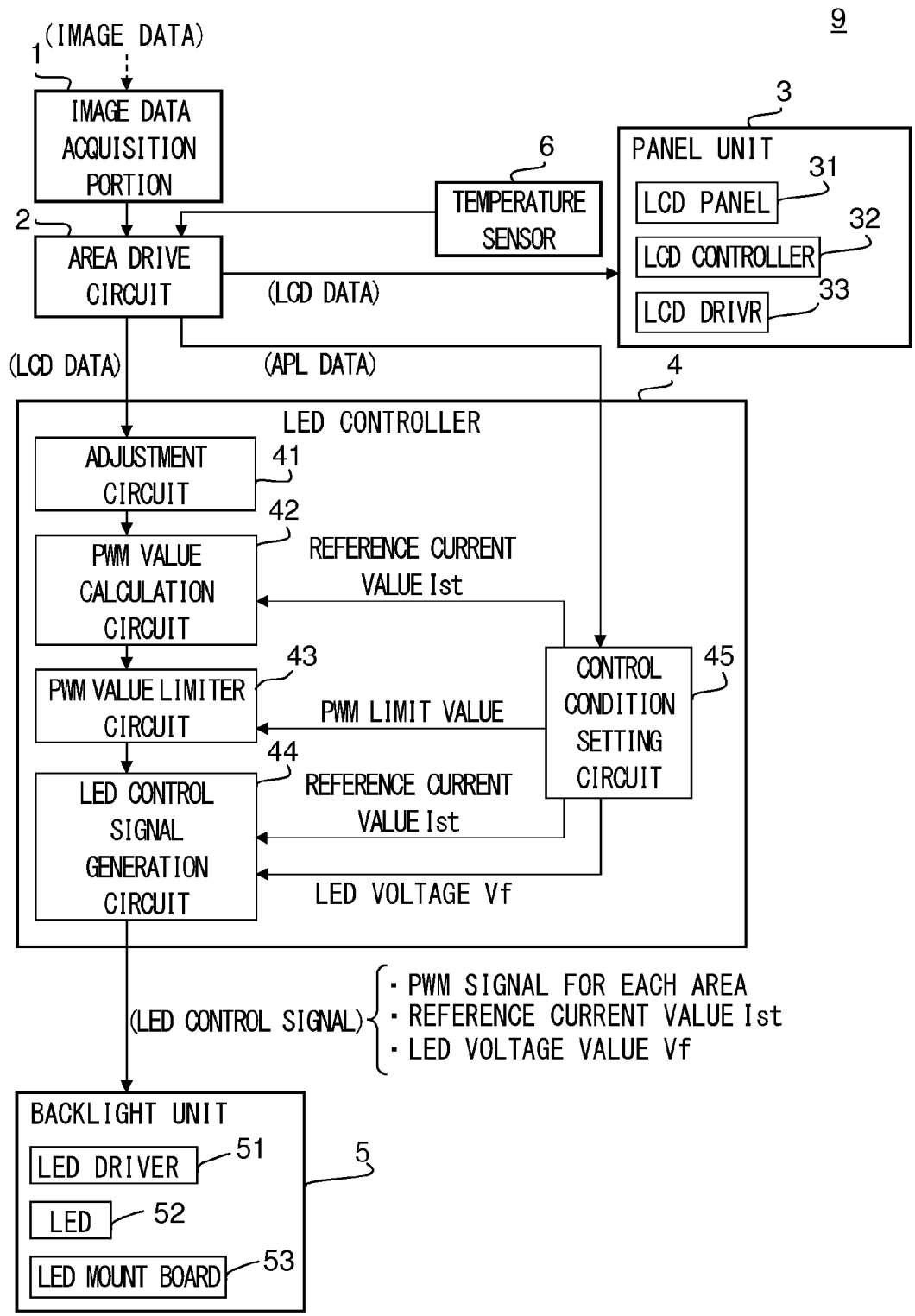
FIG. 1 is a structural view of an image display apparatus according to an embodiment of the present invention.

FIG. 1 is a structural view of an image display apparatus according to the present embodiment. As shown in this figure, the image display apparatus 9 includes: an image data acquisition portion 1; an area drive circuit 2; a panel unit 3; an LED controller 4; a backlight unit 5; a temperature sensor 6 and the like.

The image data acquisition portion 1 acquires image data for displaying an image from outside and outputs the image data to the area drive circuit 2. For example, in a case where the image display apparatus 9 is used as a television receiver, the image data acquisition portion 1 is provided with an antenna, a tuner and the like, and image data (video signal) are acquired via reception of a television broadcast. Here, the image data are data that specify brightness and the like of each pixel for each frame and specify content of a moving image (or a static image).

The area drive circuit 2 receives the image data from the image data acquisition portion 1, and based on the image data, generates data (hereinafter, called "LED data") that indicate the size of an electric current supplied to an LED of the backlight unit. When the brightness in the image data is higher, the LED data are generated so as to indicate a larger current (i.e., so as to make the LED emit brighter light). As the LED data, for example, a form of 12-bit digital signal is employed and is output to the LED controller 4 (adjustment circuit 41).

Besides, the area drive circuit 2, based on the image data, generates data that indicate an APL (hereinafter, called "APL data") of an image for each frame and outputs the data to the LED controller 4 (control condition setting circuit 45). Besides, further, the area drive circuit 2, based on the image data, generates LCD data as well that are light transmittance data of each pixel of the LCD panel 11. The generated LCD data are supplied to the panel unit 3.

The panel unit 3 is a unit that has a function as a panel for displaying an image, and is provided with: an LCD panel 31; an LCD controller 32; an LCD driver 33 and the like. The LCD driver 31 has a rectangular shape when viewed from top, and has a structure in which a pair of glass boards are attached to each other over a predetermined gap; and liquid crystal is sealed between both glass boards.

Besides, one glass board is provided with: a switching element (e.g., a thin film transistor) connected to a source line and a gate line that cross over each other at right angles; an pixel electrode connected to the switching element; further, an oriented film and the like, while the other glass board is provided with: a color filter on which color portions of R, G, and B (red, green, blue) are disposed in a predetermined arrangement; a common electrode; further, an oriented film and the like.

Besides, a light polarization plate is disposed on outsides of both boards. Here, in the present embodiment, color pixels (pixels for R, G, B colors) of 1920×1080 dots for Hi-Vision are formed on a display region of the LCD panel 31. However, another modification may be employed for the number of pixels, the kind and the like.

Figure 2:
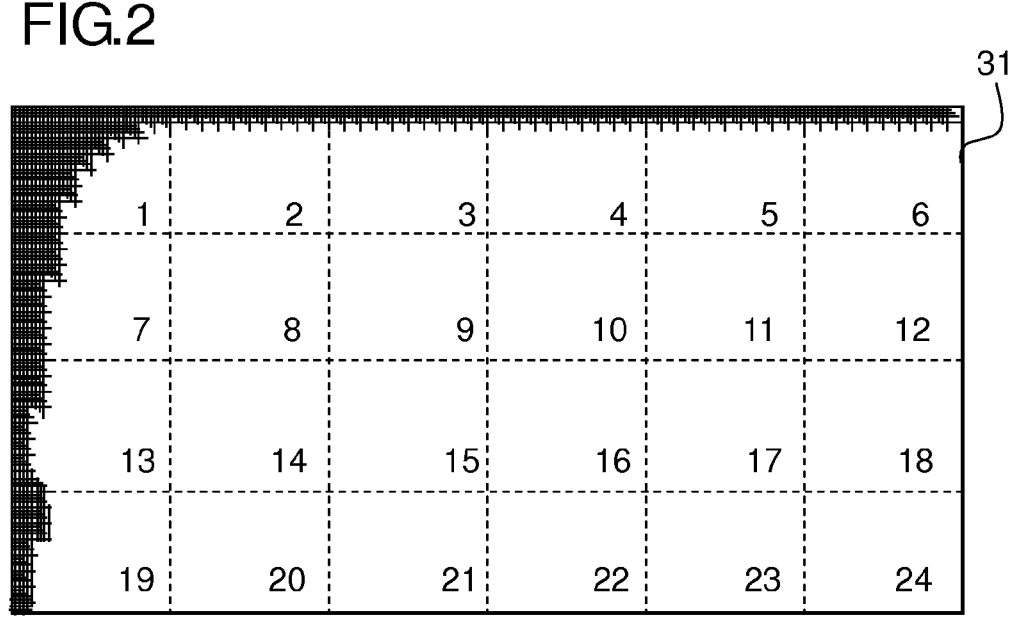
FIG. 2 is a description view regarding a part that is disposed in an LCD panel.

Here, the display region of the LCD panel 31, as shown in FIG. 2, is equally divided in 24 (=6×4) parts (1st part to 24th part). Here, a number n (n is an integer from 1 to 24) indicates that a part is an n-th part. For example, the 1st part is a portion which is at an upper left position of the display region and to which pixels of 320 (=1920/6)×270 (=1080/4) dots belong.

In the meantime, the word "part" here is defined to indicate a portion of the display region for the sake of convenience. In the present embodiment, the number of parts is 24; however, this is an example, and the number may be more or less than this. Besides, although details are described later, an LED mount board 53 disposed on a rear side of the LCD panel 31 is divided in 24 areas so as to correspond to the respective parts of the LCD panel 31 (at least one LED is mounted on each area), and a light emission state of LEDs is controlled for each area.

Back to FIG. 1, the LCD controller 32, in accordance with the LCD data supplied from the area drive circuit 2, generates a signal for driving the LCD driver 33 and outputs the signal to the LCD driver 33. The LCD driver 33, based on the signal received from the LCD controller 32, switches a state of each switching element disposed on the LCD panel 31.

According to this, in accordance with the image data, a voltage at each pixel electrode disposed on the LCD panel 3 is adjusted and light transmittance of each pixel is adjusted. According to this, the image display apparatus 9 shines light onto the backlight unit from the rear side of the LCD panel 31 (gives the light from the backlight unit to the LCD panel 31) to display an image on the display region of the LCD panel 31.

The LED controller 4 includes: an adjustment circuit 41; a PWM value calculation circuit 42; a PWM value limiter circuit 43; an LED control signal generation circuit 44; a control condition setting circuit 45 and the like. In the meantime, although details are described later, the current supplied to an LED 52 of the backlight unit 5 is controlled by means of PWM control. The LED controller 4, as described hereinafter, plays a role in generating an LED control signal necessary for this PWM control and outputting the LED control signal to the backlight unit 5.

The adjustment circuit 41 applies various adjustments such as white balance, temperature correction and the like to the LED data received from the area drive circuit and outputs the LED data to the PWM value calculation circuit 42. In the PWM value calculation circuit 42, information about a reference current value (a value of the current that is flown in each LED 52 in accordance with turning-on of the PWM control) Ist is set (recorded) in an updatable manner.

And, the PWM value calculation circuit 42, based on the LED data received from the adjustment circuit 41 and the actual set reference current value Ist, calculates duty ratios (hereinafter, sometimes called "PWM value") for the respective areas. Besides, further, the PWM value calculation circuit 42 calculates a sum as well of the PWM values for the respective areas and transmits this calculation result to the PWM value limiter circuit 43.

The PWM value limiter circuit 43 sets (records) therein, in an updatable manner, information about a PWM limit value, and limits the PWM value for each area such that the sum of the PWM values does not exceed this PWM limit value. The information about the limited PWM value for each area is output to the LED control signal generation circuit 44.

The LED control signal generation circuit 44 sets (records) therein, in an updatable manner, information about the reference current value Ist and an LED voltage value Vf (a value of a voltage required to make each LED 52 emit light suitably). Besides, the LED control signal generation circuit 44, in accordance with the PWM value for each area received from the PWM value limiter circuit 43, generates a PWM signal for each area. And, the LED control signal generation circuit 44 outputs an LED control signal, which contains each piece of information about: the PWM signal for each area; the actual set reference current value Ist; and the actual set LED voltage value Vf, to the backlight unit 5.

The control condition setting circuit 45, based on the APL data received from the area drive circuit 2, updates whenever necessary each value (the PWM limit value, the reference current value Ist, and the LED voltage value Vf) related to a control condition that is set in each circuit (42 to 44). Here, operation of the LED controller 4 is described in detail later.

The backlight unit 5 includes optical members (not shown) necessary for generation of the backlight such as: an LED driver 51; the LED 52; the LED mount board (LED panel) 53; a diffusion plate; and an optical sheet, and functions as the backlight unit for the liquid crystal display apparatus. The LED driver 51 has one or a plurality of control channels to which the LED 52 is connected. The LED driver 51, in accordance with the LED control signal supplied from the LED controller 4, drives the LED 52 connected to each control channel.

In other words, the LED driver 51, during a time the PWM signal is at a high level (on), supplies a current, which has the reference current value Ist, to the LED 52 in the area that corresponds to the PWM control signal, thereby turning on the LED 52. Here, at this time, the LED driver 51 applies a voltage, which has the LED voltage value Vf, to the LED 52.

Here, usually, when the reference current value Ist becomes large, the LED voltage value Vf becomes large, while when the reference current value Ist becomes small, the LED voltage value Vf becomes small (such control is performed by means of the LED control signal). Accordingly, to raise the reference current value Ist from now, the LED driver 51 first raises the voltage to be applied to the LED 52, thereafter, raises the reference current value Ist, while to lower the reference current value Ist from now, the LED driver 51 first lowers the reference current value Ist, thereafter, lowers the voltage to be applied to the LED 52.

On the other hand, the LED driver 51, during a time the PWM signal is at a low level (off), stops the current supply to the LED 52 in the area that corresponds to the PWM control signal, thereby turning off the LED 52. Here, each of the LEDs 52 is connected to a different control channel for each area. According to this, it is possible to control the turning on/off of the LED 52 for each area.

Besides, the LED 52 is formed, for example, as a chip, is disposed on a mount surface of the LED mount board 53 and functions as a light source of the backlight unit for the LCD panel 31. The LED mount board 53 is disposed on the rear side of the LCD panel 31 such that the mount surface opposes the LCD panel 31.

Figure 3:
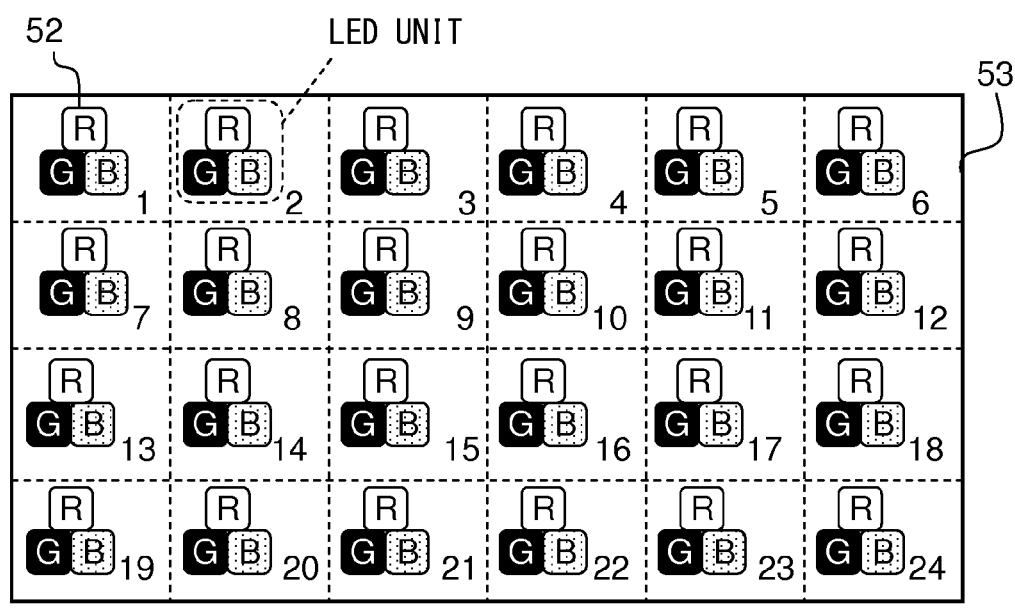
FIG. 3 is a description view regarding an area that is disposed in an LED mount board.

Here, as described above, the LED mount board 53, as shown in FIG. 3, is divided in the 24 areas that correspond to the respective parts of the LCD panel 31. Here, a number n shown in FIG. 3 indicates that a part is an n-th area. The n-th area of the LED mount board 53 corresponds to the n-th part of the LCD panel 31.

And, the LED 52 forms an LED unit that is an aggregate of LEDs that emit the respective light colors of R, G, and B (red, green, blue), and at least one LED unit is disposed in each area of the LED mount board 53. Each LED unit emits the light colors of R, G, and B to emit substantially white light as a whole. Here, the attribute (the kind, the color, a combination and the like) of the LED 52 may be another attribute. For example, instead of the above LED unit, a white light LED may be used, or an LED unit, which is an aggregate of LEDs that emit light colors of R, G, B, and W (red, green, blue, white), may be used.

Here, the n-th area of the LED mount board 53 is disposed substantially right behind the n-th part of the LCD panel 31. Because of this, the light emission intensity (i.e., the size of supplied light emission power) of the LED unit in the n-th area has an especially great influence on the brightness of image display in the n-th part.

The temperature sensor 6 is formed of, for example, a thermistor or a thermocouple, and mounted on the LED mount board 53 (near the LED 52). According to this, the temperature sensor 6 detects a temperature near the LED 52. Information about the detected temperature is transmitted to the area drive circuit 2 and used for a correction process of a tint in the image display.

The image display apparatus 9 has the above structure, generates the LCD data and the LED data based on the image data acquired by the image data acquisition portion 1, and controls the light transmittance of the LCD panel 31 and the brightness of the LED 52 (backlight), thereby displaying the image. Here, a control procedure of the backlight brightness in the image display apparatus 9 is described in more detail.

[Backlight Brightness Control Procedure]

Figure 4:
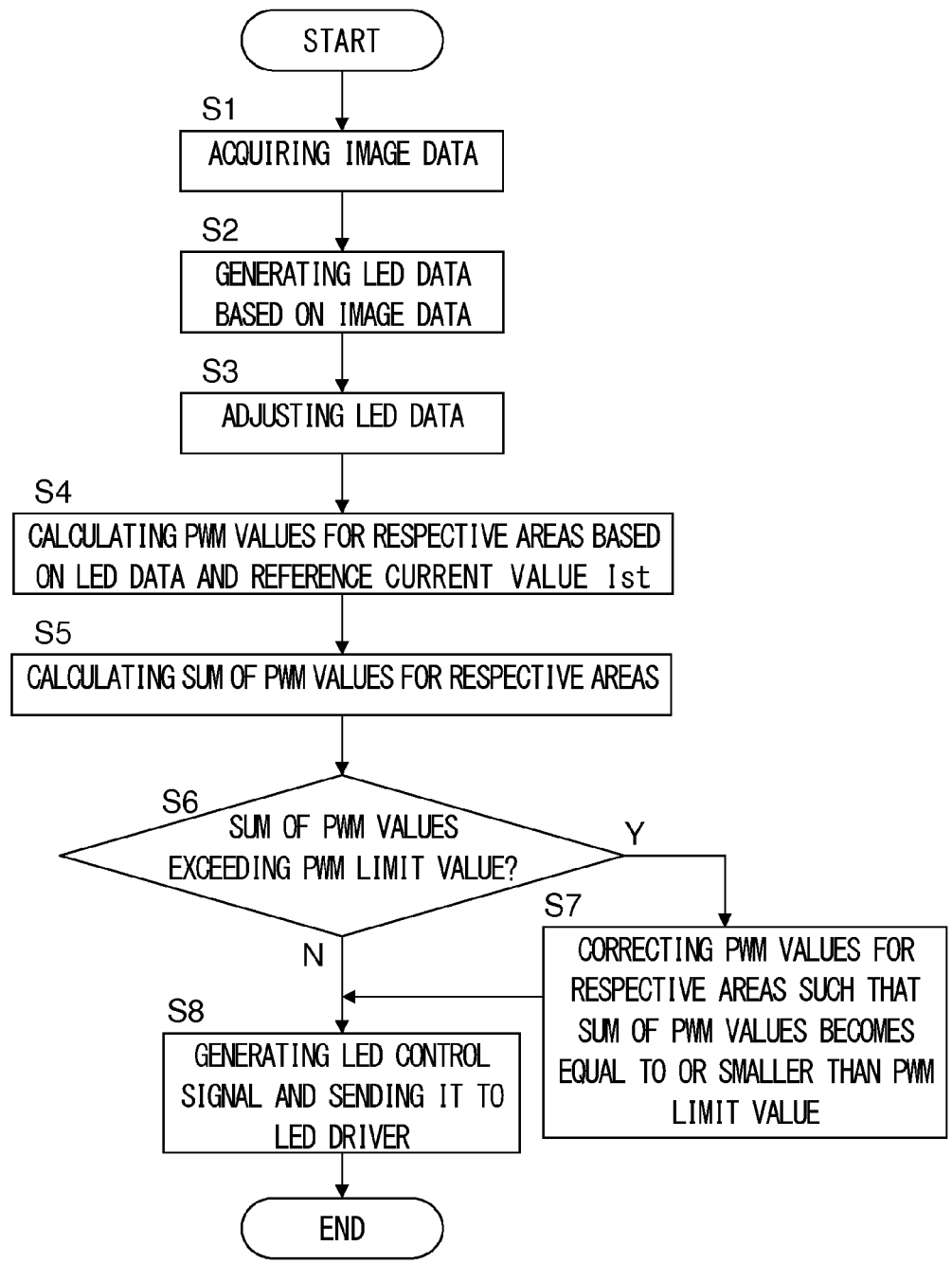
FIG. 4 is a flow chart regarding a control procedure of backlight brightness.

Next, a control procedure of the backlight brightness is described with reference to a flow chart shown in FIG. 4.

The image data acquisition portion 1 acquires the image data via reception of a television broadcast and the like (step S1), and the acquired image data are input into the area drive circuit 2. On receiving the image data, the area drive circuit 2, based on the image data, generates the LED data for each area (the 1st area to the 24th area) (step S2). The LED data indicate a total amount of the currents to be supplied to the LEDs 52 for the respective areas.

Here, in the present embodiment, the LED data for each area are decided based on the brightness maximum value of the image data corresponding to each area. In other words, a plurality of pixels are present in each part of the LCD panel 31 that corresponds to each area. Accordingly, the LED data for each area are decided based on the maximum value of the brightnesses of the plurality of pixels.

Here, the decision method of the LED data is not limited to this, and for example, the LED data may be decided based on an average value of the brightnesses of the plurality of pixels that correspond to each area. Besides, in the present embodiment, the LED data decision for each area is performed for a frame period (i.e., for every one frame) of the acquired image data.

However, the period at which the LED data decision is performed is not limited to this, and, for example, may be performed for every 5 frames or every 30 frames. Besides, in a case where the acquired image data indicate a static image, the LED data decision may be performed only when the screen changes.

Thereafter, the adjustment circuit 41 of the LED controller 4 receives the LED data from the area drive circuit 2 and applies adjustments such as white balance, temperature correction and the like to the LED data (step S3). Thereafter, the PWM value calculation circuit 42, based on the adjusted LED data and the reference current value Ist, calculates the PWM values that correspond to the respective areas (step S4).

The PWM value of each area is calculated by a formula that is expressed as follows:

$$\text{(the LED data value)}/\{\text{(the reference current value Ist)} \times \text{(the number of LEDs for one area)}\}.$$

In other words, for one area, the PWM value calculation is performed such that the sum of the currents supplied to the LEDs 52 by means of the PWM control becomes equal to the LED data value. Here, even if the LED data value is identical, when the reference current value Ist is larger, the PWM value is calculated to be a smaller value, while when the reference current value Ist is smaller, the PWM value is calculated to be a larger value.

According to the process in the step S4, for example, the PWM values for the respective areas are calculated to be values shown in FIG. 5. Here, the number n in each box in FIG. 5 indicates the n-th area; accordingly, for example, the PWM value for the 7th area is 100(%). According to FIG. 5, the PWM value for each area is calculated to be any one of 0(%), 50(%), and 100(%).

Besides, the PWM value calculation circuit 42 calculates the sum of the calculated PWM values corresponding to the respective areas (step S5). According to the process in the step S5, for example, in the case where the PWM values corresponding to the respective areas are as shown in FIG. 5, the sum PWMsum of the PWM values are calculated as follows:

PWMsum=(the PWM value for the 1st area)+(the PWM value for the 2nd area)+ . . . (the PWM value for the 24th area)=1600(%) (an area average value is 66.7%)

Next, the PWM value limiter circuit 43 determines whether the calculated sum PWMsum of the PWM values exceeds the actual set power limit value or not (step S6). As a result of this, in a case where it is determined not-exceeding (N in the step S6), the PWM value limiter circuit 43 outputs the information about the PWM values corresponding to the respective area as they are to the LED control signal generation circuit 44.

However, in a case where it is determined exceeding (Y in the step S6), the PWM value limiter circuit 43 corrects the PWM values corresponding to the respective areas such that the sum PWMsum of the PWM values becomes equal to or smaller than the PWM limit value (i.e, an upper limit of the sum PWMsum of the PWM values is limited up to the PWM limit value) (step S7). The correction procedure of the PWM values corresponding to the respective areas is as follows.

First, the PWM value limiter circuit 43 calculates a limit rate α that is a value obtained by dividing the PWM limit value by the sum PWMsum of the PWM values. For example, in a case where the PWM values corresponding to the respective areas are as shown in FIG. 5 (accordingly, the sum PWMsum of the PWM values is 1600(%)) and the PWM limit value is set at 1200(%), the limit rate α is calculated to be 1200/1600=0.75.

Thereafter, the PWM value limiter circuit 43 multiplies the actual PWM values corresponding to the respective areas by the limit rate α, thereby correcting the PWM values corresponding to the respective areas. According to this, information about the corrected PWM values corresponding to the respective areas is generated. For example, in a case where the PWM values corresponding to the respective areas are as shown in FIG. 5 and the limit rate α is 0.75, the corrected PWM values corresponding to the respective areas become values shown in FIG. 6.

According to this, the sum PWMsum of the corrected PWM values becomes the PWM limit value or smaller (which is equal to the PWM limit value in the case of the present embodiment), as a result of this, the upper limit of the sum PWMsum of the PWM values is limited to the PWM limit value. As described above, the PWM limit value is also regardable as a condition (PWM limit condition) that sets a predetermined limitation on the PWM value. However, the PWM limit condition may be another form of condition other than this. Besides, the PWM value limiter circuit 43 outputs the information about the corrected PWM values corresponding to the respective areas to the LED control signal generation circuit 44.

Here, the corrected PWM values corresponding to the respective areas are the values obtained by dividing the before-correction values by the limit rate α. Because of this, as a ratio of the corrected PWM value for each area, a state before the correction is kept as it is. In other words, first, the ratio of the PWM value for each area is decided based on the image data, and the calculation of the PWM value for each area is performed in accordance with the decided ratio such that the sum PWMsum of the PWM values does not exceed the PWM limit value. As a result of this, the image display apparatus 9 is able to keep the image display that has a high contrast ratio (which gives a peak-brightness feeling) while limiting the consumed power of the backlight unit.

Next, the LED control signal generation circuit 44, in accordance with the information about the PWM values for the respective areas received from the PWM value limiter circuit 43, generates PWM signals corresponding to the respective areas. And, in addition to this PWM signal, the LED control signal generation circuit 44 generates an LED control signal which contains each piece of information about the actual set reference current value Ist and the actual set LED voltage value Vf and outputs the LED control signal to the backlight unit 5 (step S8). According to this, the current supplied to the LED 52, which belongs to each area, is controlled in accordance with the PWM signal (by means of the PWM control) corresponding to the area.

[Update of Each Value Related to Control Condition]

Figure 7:
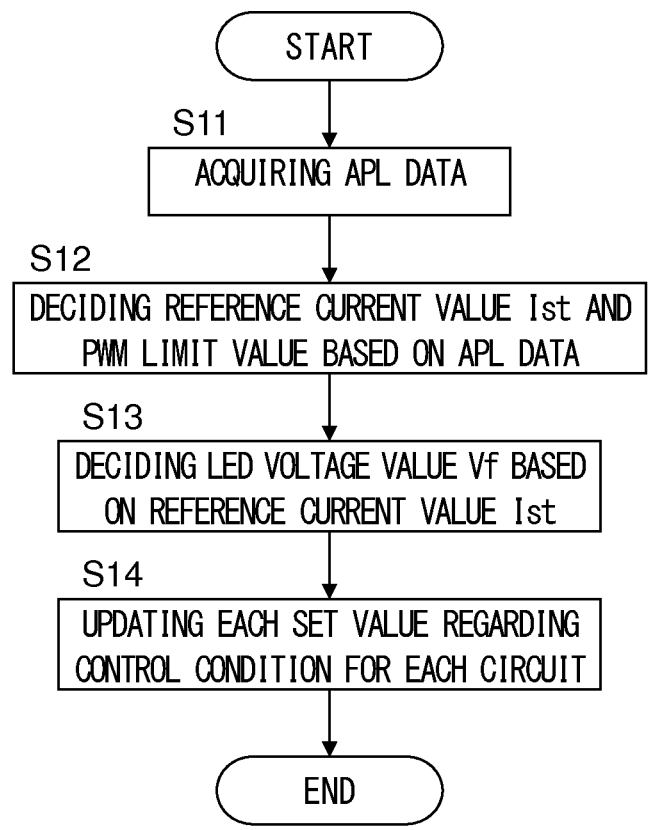
FIG. 7 is a flow chart regarding a procedure for setting each value related to a control condition.

Each value (the PWM limit value, the reference current value Ist, and the LED voltage value Vf) related to the control condition of the backlight that is set in each of the circuits (42 to 44) is chiefly updated by operation of the control condition setting circuit 45. The update procedure is hereinafter described with reference to a flow chart shown in FIG. 7.

The control condition setting circuit 45 acquires APL data for one frame of the image data from the area drive circuit 2 (step S11) and performs operation (hereinafter, called "update operation" for the sake of convenience) for achieving the update.

The period at which the update operation is performed is not limited to this, and, for example, may be performed for every 5 frames or every 30 frames. Besides, in a case where the acquired image data indicate a static image, the update operation may be performed only when the screen changes. Besides, in a case where the update operation is performed, for example, for every 5 frames, as the APL data used for the update operation, the then-actual APL data (i.e, the APL for one frame) may be used, or an average of the APL data for the nearest 5 frames may be used.

Here, if the update timing of the PWM limit value and the update timing of the reference current value Ist are different from each other, matching between these values is not secured, and a brightness change in the image display is likely to give an uncomfortable feeling to a user. Because of this, the update of these values is executed substantially concurrently, that is, such that deviation between the timings is confined within one frame (the frame update period of the moving image display).

Besides, the control condition setting circuit 45, as the update operation, first decides the reference current value Ist and the PWM limit value based on the acquired APL data (step S12). Here, the control condition setting circuit 45 records beforehand therein information that specifies a relationship among the APL data, the reference current value Ist and the PWM limit value (e.g., a function or a LUT [Look Up table] that indicates the relationship, hereinafter, called "first reference information"). The control condition setting circuit 45 refers to the first reference information, and decides the reference current value Ist and the PWM limit value. In the meantime, it is described in a section of "content of first reference information" explained later about how content of the first reference information is decided.

Next, the control condition setting circuit 45, based on the decided reference current value Ist, decides the LED voltage value Vf (step S13). The control condition setting circuit 45 records beforehand therein information that specifies a relationship between the reference current value Ist and the LED voltage value Vf (e.g., a function or a LUT [Look Up table] that indicates the relationship, hereinafter, called "second reference information"); the control condition setting circuit 45 refers to the second reference information, and decides the LED voltage value Vf.

As for the LED, it is known that the LED voltage value Vf changes depending on the flowing current (generally, the larger the current becomes, the larger the LED voltage value also becomes). Besides, it is possible to ascertain beforehand a relationship between the flowing current and the LED voltage value Vf (e.g., by actual measurements in a design stage of the image display apparatus 9). Because of this, it is possible to record beforehand the second reference information in the control condition setting circuit 45.

Here, the LED voltage value Vf changes depending on the temperature as well of the LED. Accordingly, a detection result from the temperature sensor 6 may be transmitted to the control condition setting circuit 45 as well, and based on not only the decided reference current value Ist but also the detection result from the temperature sensor, the LED voltage value Vf may be decided. In this case, the second reference information is set as information that specifies a relationship between the reference current value Ist and the LED voltage value Vf at each temperature.

At a time point the operation in the step S13 is completed, based on the APL data newly acquired this time, each value related to the control condition, that is, each of the PWM limit value, the reference current value Ist and the LED voltage value Vf is newly decided. Accordingly, the control condition setting circuit 45 outputs information about these newly decided values to each of the circuits (42 to 44).

According to this, each of the set values related to the control condition for the each of the circuits (42 to 44) is updated to the new value received from the control condition setting circuit 45 (step S14). Hereinafter, each of the set values updated this time and related to the control condition is kept until the next update is performed.

Here, in the above description, for the sake of easy understanding, the light emission control is applied to each LED 52 in the same way; however, the light emission control of the LED 52 may be independently performed for each color of R, G, and B. By setting independently the various data and values (the LED data, the PWM value, the PWM limit value, the reference current value Ist, the LED voltage value Vf and the like) for each color and by performing the above series of operations (the steps S1 to S8, the steps S11 to S14) for each color, the light emission control of the LED 52 for each color is achieved.

Figure 8:
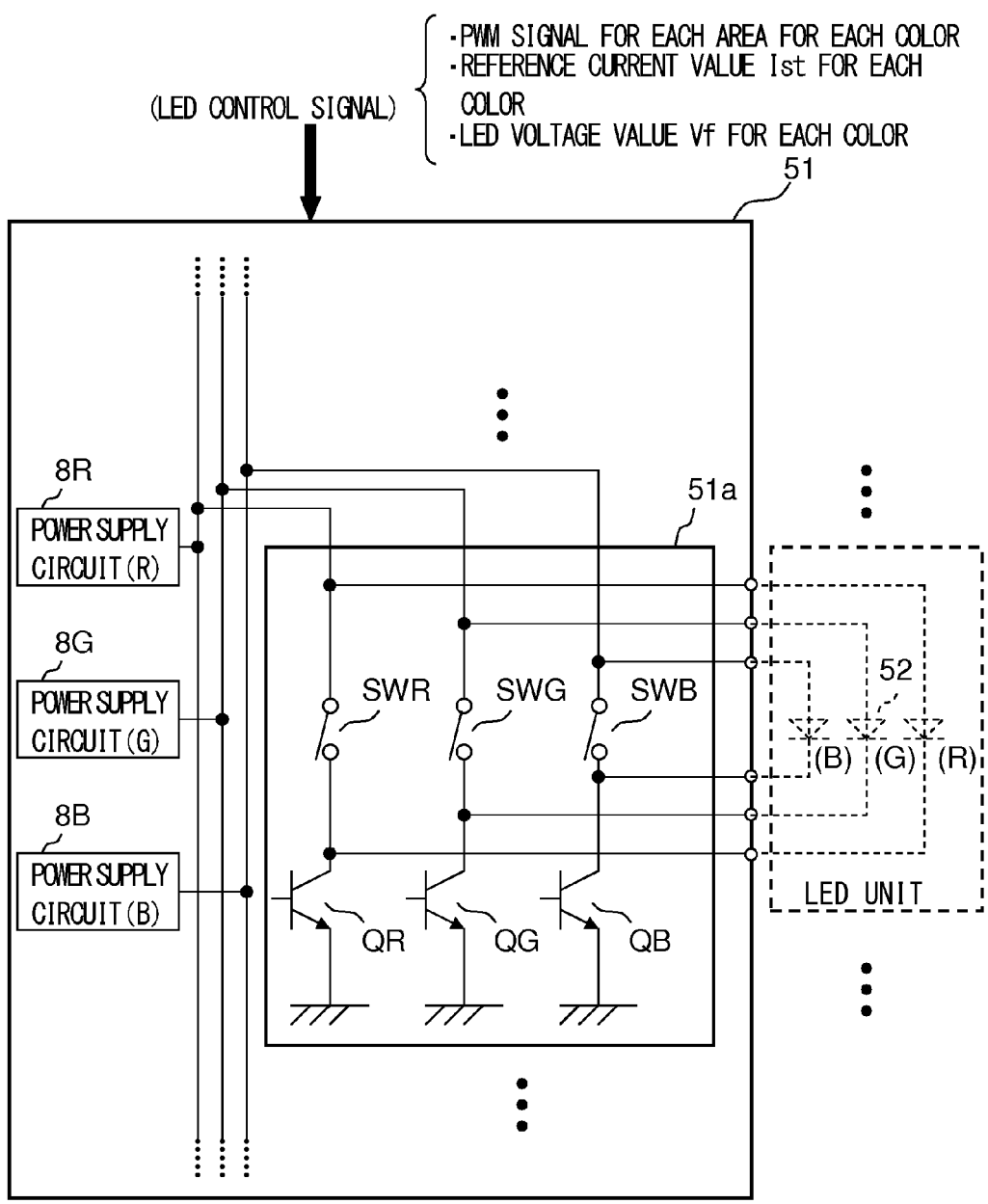
FIG. 8 is a description view regarding a structure of an LED driver.

FIG. 8 shows a structural example of the LED driver 51 in the case where the light emission control of the LED 52 is independently performed for each color (R, G, B). In this structure, the LED driver 51 is provided with: power supply circuits (8R to 8B) corresponding to the respective colors of R, G, and B; and a control component 51*a* corresponding to each LED unit that is disposed on the LED mount board 53. Besides, the LED control signal, which contains: the PWM signal for each area; the information about the reference current value Ist for each color; and the LED voltage value Vf for each color, is sent to the LED driver 51 from the LED controller 4.

The power supply circuit 8R corresponding to the red (R) receives the information about the LED voltage value Vf for the red (R) via a not-shown DAC [Digital Analog Converter], and generates a voltage corresponding to this value. Besides, likewise, also the power supply circuits (8G, 8B) corresponding to the green (G) and blue (B) receive the information about the LED voltage values Vf for the green (G) and blue (B), respectively, and generate voltages corresponding to the values.

Besides, the control component 51*a* is provided with: transistors (QR to QB) whose collectors are connected to the power supply circuits (8R to 8B), respectively, and whose emitters are grounded; and switches (SWR to SWB) that switch connection/disconnection between the power supply circuits (8R to 8B) and the transistors (QR to QB), respectively. Besides, one and the other terminal of the switch SWR are connected to the LED 52 for the red (R) of the LED unit; one and the other terminal of the switch SWG are connected to the LED 52 for the green (G) of the LED unit; and one and the other terminal of the switch SWB are connected to the LED 52 for the blue (B) of the LED unit.

And, the transistor QR corresponding to the red (R), in accordance with the information about the reference current value Ist for the red (R), adjusts a current flowing between the collector and the emitter. Besides, likewise, also the transistors (QG, QB) corresponding to the green (G) and blue (B) receive the information about the reference current values for the green (G) and blue (B), respectively, and adjust the currents flowing between the collector and the emitter in accordance with the information.

Besides, the switch SWR corresponding to the red (R) is switched to be turned on/off (on/off) in accordance with the PWM signal for the red (R). Besides, likewise, the witches SWG and SWB corresponding to the green (G) and blue (B) are switched to be turned on/off (on/off) in accordance with the PWM signals for the green (G) and blue (B), respectively.

According to this structure, adjustment of the voltage applied to the LED 52 is achieved chiefly by the power supply circuits (8R to 8B), and adjustment of the size of the current flowing in the LED 52 is achieved chiefly by the transistors (QR to QB). Besides, the switching of the on/off of the PWM control is achieved chiefly by the switches (SWR to SWB). In the meantime, the structure described here is an example, and the LED driver 51 may have another structure.

[Content of First Reference Information]

As for the above first reference information, after the content of the first reference information is decided beforehand, the first reference information is recorded into the control condition setting circuit 45, for example, in the design stage of the image display apparatus 9. A specific example of how the content of the first reference information is decided is described hereinafter.

First, regarding the image display apparatus 9, the setting of the PWM limit value is fixed, and an investigation is performed for a relationship between the APL of an image and the peak brightness of the LED 52 during the time the image is displayed. The investigation is performed, for example, by preparing data of respective test images in which the APL has various values; and measuring the respective peak brightnesses of the LED 52 when these test images are successively displayed. This investigation is performed for a plurality of the PWM limit values.

Here, in the investigation, the reference current value Ist is set in accordance with the then-actual PWM limit value such that the following formula (1) is met.

$$\begin{aligned}&\text{(the reference current value Ist)} \times \text{(the number of LEDs}\\ &\quad\text{\textbf{52} for one area)} \times \text{(the PWM limit value)} \times \text{(the}\\ &\quad\text{maximum LED voltage value Vf)} = \text{(the upper}\\ &\quad\text{limit value of the consumed power of the back-}\\ &\quad\text{light unit)}\end{aligned} \quad (1)$$

Here, "the number of LEDs for one area" and "the maximum LED voltage value Vf" are fixed values that are ascertained beforehand. Besides, as for "the upper limit value of the consumed power of the backlight unit", from the viewpoint of power saving, heat generation alleviation and the like, a predetermined value is decided as standards.

In other words, the reference current value Ist is set such that the sum of the consumed power of the LEDs 52 does not exceed "the upper limit value of the consumed power of the backlight unit" and the reference current value Ist does not become smaller than expected. Here, in a case where the LEDs 52 undergo the light emission control for respective colors, under the same purpose, the reference current value Ist is set such that a totalized value of the sums of the consumed power of the LEDs 52 for the respective colors does not exceed "the upper limit value of the consumed power of the backlight unit".

Figure 9:
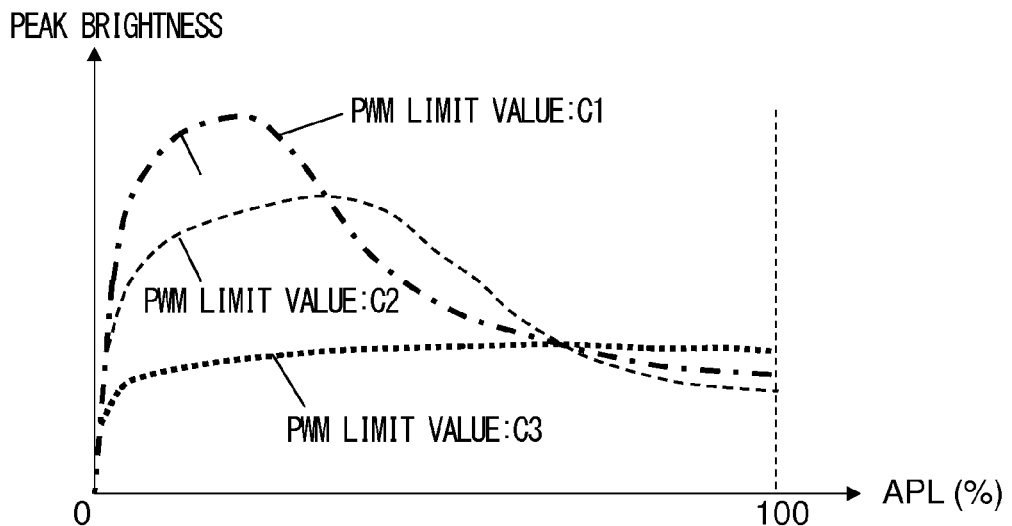
FIG. 9 a description view regarding a procedure for deciding first reference information.

When the above investigation is performed for each of, for example, the PWM limit values C1, C2, and C3 (where C1<C2<C3), for example, an investigation result shown in FIG. 9 is obtained. Here, in a graph shown in FIG. 9, a horizontal axis indicates the APL (%) and a vertical axis indicates the peak brightness of the LED 52. Besides, the graph represents a case, where the PWM limit value is fixed to the C1, by means of a one-dot-one-bar line; a case, where the PWM limit value is fixed to the C2, by means of a broken line; and a case, where the PWM limit value is fixed to the C3, by means of a dotted line. According to FIG. 9, the PWM limit value, at which the peak brightness becomes the maximum, changes depending on the APL.

Figure 10:
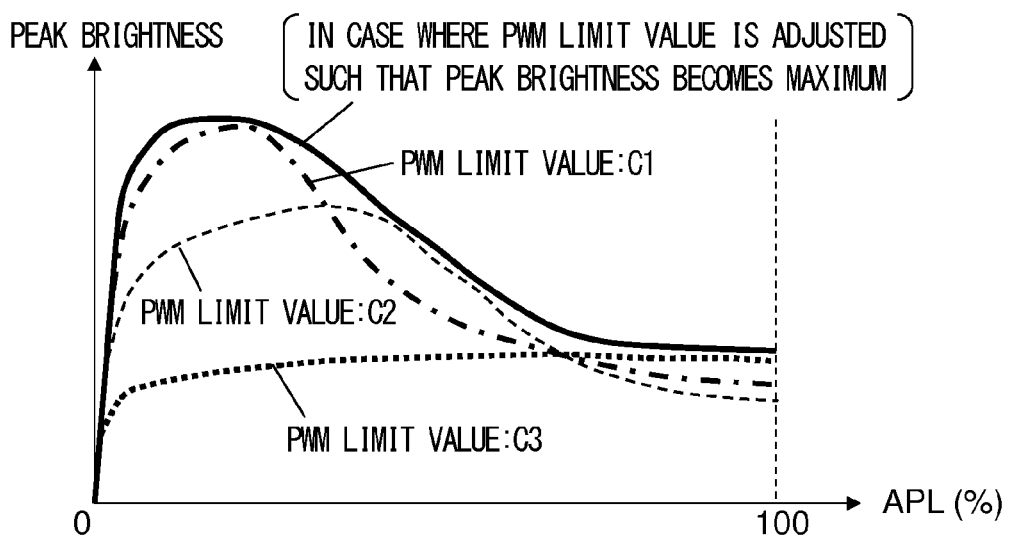
FIG. 10 is another description view regarding a procedure for deciding first reference information.

Accordingly, based on this investigation result, a case is assumed, where the PWM limit value is adjusted such that the peak brightness of the LED 52 becomes the maximum for each APL. Here, in a case where the adjustment is performed in such a manner, a relationship between the APL and the peak brightness of the LED 52 is, for example, as shown in FIG. 10 by means of a solid line. And, in this case, a relationship between the APL and the PWM limit value is obtained.

According to this relationship, the PWM limit value, which brings the maximum peak brightness, is obtained while alleviating the consumed power of the backlight unit within a tolerable range. And, on the basis of the relationship obtained in this way, in accordance with an actual situation, information about a relationship, which is obtained by setting various constraints (e.g., a predetermined lower limit value is set on the PWM limit value.) and applying a predetermined correction, is employed as the first reference information.

Besides, if the relationship between the APL and the PWM limit value is decided, also a relationship between the APL and the reference current value Ist is decided. Accordingly, also this relationship between the APL and the reference current value Ist is employed as the first reference information.

Figure 11:
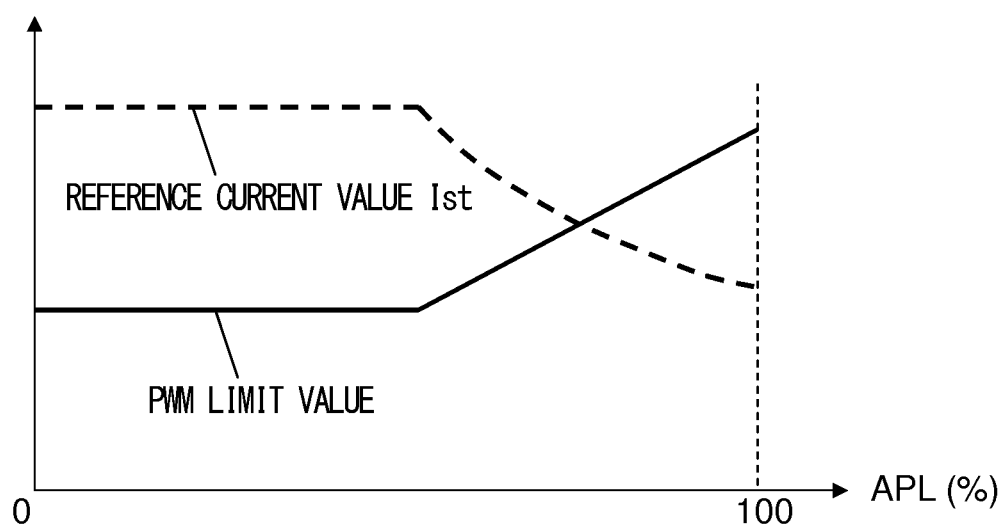
FIG. 11 is a description view showing an example of content of first reference information.

According to the procedure described above, as the first reference information that specifies the relationship among: the APL; the PWM limit value; and the reference current value Ist, for example, information about content shown in FIG. 11 is obtainable. However, the above procedure is only an example, and the content of the first reference information is obtainable by means of other various procedures.

Here, in a case where the relationship (e.g., the relationship expressed by the above formula (1)) between the reference current value Ist and the PWM limit value is set beforehand, the first reference information may be information that specifies the relationship only between the APL and the PWM limit value or may be information that specifies the relationship only between the APL and the reference current value Ist. Even in this case, if the APL is specified, it is possible to specify both of the reference current value Ist and the PWM limit value.

[Tint Correction Via Panel Unit]

In the meantime, generally, it is known that an actual light color (light wavelength) from an LED changes depending on the temperature of the LED and the size of the flowing current. This change degree is different depending on the kind (e.g, the colors of R, G, B) of the LED, and the change degree is especially large in a green (G) LED.

Because of this, in the image display apparatus 9 that uses the LED 52 as the light source of the backlight unit, the tint of the image display changes depending on the temperature of the LED 52 and the size of the flowing current. For example, in a case where the backlight unit uses an LED unit (emitting white light as a whole in an ideal state) which is an aggregate of LEDs that emit the light colors of R, G, and B, a balance among the respective colors of R, G, and B is not obtained and the LED unit does not emit the original light color, whereby the tint of the image display changes. Because of this, it is desirable that the change is corrected in the image display apparatus 9. A method example, which achieves this tint correction via the panel unit 3, is described hereinafter.

As described above, the area drive circuit 2 generates and outputs the LCD data to the panel unit 3, and the light transmittance of the LCD panel 31 is set in accordance with the LCD data. Because of this, the LCD data are generated such that the tint of the image display is corrected (such that the light transmittance becomes small for a color pixel whose brightness should be made small).

More specifically, the information about the actual set reference current value Ist (which indicates the size of the current that is flowing in the LED 52) is transmitted to the area drive circuit 2. And, the area drive circuit 2 considers comprehensively the detection information from the temperature sensor 6 and the information about the reference current value Ist (here, either information only may be considered), and generates the LCD data such that the tint of the image display is corrected. In other words, based on at least one of the actual set reference current value Ist and the detected temperature, the LCD data are generated such that the light transmittance of the LCD panel 31 is corrected for each color.

Here, it is known beforehand how the light color emitted from the LED changes when the temperature of the LED and the size of the flowing current change; accordingly, it is possible to generate the LCD data in such a manner. According to this, it becomes possible to achieve the tint correction of the image display via the panel unit 3.

[Tint Correction Via Backlight Unit]

In a case where the LED unit (see FIG. 3), which includes LEDs for the light colors of R, G, and B, is used as the light source of the backlight unit and values such as the reference current value Ist and the like are set for each color, it is also possible to achieve the tint correction of the image display via the backlight unit 5. A method example for achieving this correction is described hereinafter.

As described above, the control condition setting circuit 45 decides the values such as the reference current value Ist and the like in accordance with the APL data; and the set values in each circuit (42 to 44) such as the reference current value Ist and the like are updated to the decided values. Because of this, the reference current value Ist is decided such that the tint of the image display is corrected (such that the flowing current becomes small in the LED 52 that emits a light color whose brightness should be made small).

More specifically, the detection information from the temperature sensor 6 is transmitted to the control condition setting circuit 45 as well. And, the control condition setting circuit 45 decides the reference current value Ist in accordance with the APL data (see the step S12); thereafter, considers comprehensively this decided reference current value Ist and the detection information from the temperature sensor 6 (here, either information only may be considered), and corrects the reference current value Ist for each color such that the tint of the image display is corrected.

According to this, it becomes possible to achieve the tint correction of the image display via the panel unit 3. Here, it is preferable that the correction of the reference current value Ist is performed such that the reference current value Ist for any one of the colors becomes smaller than the actual value (i.e, so as not to exceed the actual value). According to this, it is possible to avoid a situation in which the consumed power of the backlight unit exceeds the tolerable range because of the correction of the reference current value Ist.

[LED Driver Specifications]

In the meantime, generally, in an LED driver, a required structure condition and the like are different depending on the maximum power supply that is a characteristic of the LED driver. More specifically, an LED driver having relatively large maximum power supply is able to supply large power; however, because a structure durable for heat generation is required, size reduction becomes hard.

On the other hand, an LED driver having relatively small maximum power supply is unable to supply large power; however, because it is known beforehand that great heat generation does not occur, size reduction becomes easy. In a case where an LED driver is used as a constituent component of various apparatuses, an LED driver having suitable maximum power supply is selected in accordance with performance, use and the like of the apparatuses.

Here, from the viewpoint of the maximum power supply, an LED driver preferable for the image display apparatus 9 according to the present embodiment is proposed. The LED driver supplies the current to the LED by means of the PWM control, and conforms to specifications (hereinafter, called "current limiting specifications" for the sake of convenience) in which the sum of the supplied currents is automatically limited so as not to exceed a predetermined value. A specific structure and the like of the LED driver based on the current limiting specifications is as follows.

The LED driver based on the current limiting specifications has a plurality of control channels to which one or a plurality of LEDs are connected, and the duty ratio for the PWM control is variable for each channel (i.e., for one or a plurality of LEDs). And, each control channel supplies the reference current (common to each control channel) to the connected LED in accordance with the turning-on of the PWM control. In other words, the current, which each control channel flows in accordance with the turning-on of the PWM control, becomes (the reference current)×(the number of LEDs connected to the channel).

Besides, in the LED driver based on the current limiting specifications, also the reference current value is variable. Data, which allow specification of the duty ratio for each control channel and the value of the reference current, are input, for example, from outside into the LED driver based on the current limiting specifications; basically, the LED driver based on the current limiting specifications supplies the current to each LED.

However, in the LED driver based on the current limiting specifications, an upper limit value of a product of the reference current value and the sum of the duty ratios is decided; in accordance with this upper limit value, the reference current is limited. In other words, the LED driver based on the current limiting specifications calculates the sum of the duty ratios for the respective control channels, and limits the reference current value to a value (limiting value) that is obtained by dividing the upper limit value by this calculated value. Even if data for making the reference current value exceed this limiting value are input, the LED driver limits the actual reference current value to a value that is equal to or smaller than this limiting value.

Here, the LED driver based on the current limiting specifications may limit the sum of the duty ratios instead of limiting the reference current. In this case, after the reference current value is decided, the LED driver limits the sum of the duty ratios to a value (limiting value) that is obtained by dividing the above upper limit value by this reference current value. Even if the sum of the duty ratios is calculated to be a value that exceeds this limiting value, the LED driver limits the sum of the duty ratios to a value that is equal to or smaller than this limiting value.

In any way, the sum of the supplied currents is expressed as (the reference current value)×(the number of LEDs connected to each channel[at least the maximum value is decided])×(the sum of the duty ratios); accordingly, if the upper limit value of the product of the reference current value and the sum of the duty ratios is decided, the upper limit of the sum of the supplied currents is limited.

According to the LED driver base on the current limiting specifications that operates as described above, in a case where the sum of the duty ratios is small, it is possible to enlarge the reference current value and enlarge the peak brightness of the LED. And, further, according to the LED driver, the sum of the supplied currents is limited (in a case where the sum of the duty ratios is large, the reference current value does not become large); accordingly, the maximum power supply is small compared with an LED driver in which the reference current value is fixed to a large value. Because of this, the LED driver is not required to have a structure durable for heat generation, and becomes easy in size reduction and cost reduction.

As described above, the LED driver based on the current limiting specifications has both of the advantage (heat generation is small, size reduction and the like are easy) of the LED driver in which the reference current value is foxed to a small value and the advantage (it is possible to enlarge the peak brightness of the LED) of the LED driver in which the reference current value is fixed to a large value. Because of this, for example, if the LED driver based on the current limiting specifications is applied to the image display apparatus 9 according to the present embodiment, it becomes easy to achieve size reduction and cost reduction of the image display apparatus 9 while keeping the original function of the image display apparatus 9.

Here, the above LED driver based on the current limiting specifications is preferably applied to the image display apparatus 9 according to the present embodiment in which the reference current value Ist and the PWM limit value are updated whenever necessary; however, is also applicable to other various apparatuses which use an LED.

[Summing Up]

The image display apparatus 9 according to the present embodiment described above includes the device (light emitting device for image display) that includes, as chief constituent elements, the area drive circuit 2; the LED controller 4; and the backlight unit 5. And, this light emitting device for image display includes: the backlight unit 5 (light emitting unit) which is divided in the plurality of areas and provided with the plurality of the LEDs 52 (light emitting element) each of which emits the light in accordance with the supplied current and corresponds to each of the areas; and the function portion (PWM control portion) which supplies the current to the LED 52.

Besides, this light emitting device for image display includes: the function portion (control condition setting portion) which decides: the PWM control condition for setting a predetermined limitation on the duty ratio (PWM value) for the PWM control; in accordance with the APL of the image data, decides and sets, in an updatable manner, the value (reference current value Ist) of the current which flows in the LED 52 in accordance with the turning-on of the PWM control; besides, the light emitting device for image display includes the function portion (duty ratio calculation portion) as well which calculates the PWM values for the respective areas based on the image data, the PWM limit condition, and the reference current value Ist.

Here, in the present embodiment, the PWM limit value, which is the upper limit value of the sum of the PWM values for the respective areas, is decided as the PWM limit condition. However, the PWM limit condition may be another attribute. Besides, the PWM control portion performs the PWM control based on the reference current value Ist and the calculated PWM value.

Because of this, according to this light emitting device for image display, the reference current value Ist and the PWM limit condition are set in an updatable manner in accordance with the APL of the image data, and the PWM control is applied to the current supplied to the LED 52 based on the image data and the PWM value that is calculated based on these settings.

Because of this, according to this light emitting device for image display, it is possible to control the current supplied to the LED 52 by means of the PWM control and set flexibly the reference current value Ist and the PWM limit condition for the PWM control in accordance with the APL of an image. As a result of this, by suitably preparing the first reference information to allow the LED 52 to efficiently emit the light in accordance with the APL, a light emitting device for image display, which efficiently emits the light, is achieved.

Here, if the reference current value Ist is changed, the LED voltage Vf and the light color (light wavelength) emitted from the LED also change. However, as already described, according to the light emitting device for image display in the present embodiment, it is possible to suitably deal with these changes and keep excellent image display.

Hereinbefore, the embodiments of the present invention are described; however, the present invention is not limited to the description content. Besides, it is possible to add various modifications to the present invention without departing the spirit of the present invention.

INDUSTRIAL APPLICABILITY

The present invention is applicable to various image display apparatuses and the like.

REFERENCE SIGNS LIST 1 image data acquisition portion
2 area drive circuit
3 panel unit
4 LED controller
5 backlight unit
6 temperature sensor
8R power supply circuit corresponding to red (R)
8G power supply circuit corresponding to green (G)
8B power supply circuit corresponding to blue (B)
9 image display apparatus
31 LCD panel
32 LCD controller
33 LCD driver
41 adjustment circuit
42 PWM value calculation circuit
43 PWM value limiter circuit
44 LED control signal generation circuit
45 limit condition setting circuit
51 LED driver
51a control component
52 LED (a form of light emitting element)
53 LED mount board
SWR switch corresponding to red (R)
SWG switch corresponding to green (G)
SWB switch corresponding to blue (B)
QR transistor corresponding to red (R)
QG transistor corresponding to green (G)
QB transistor corresponding to blue (B)

The invention claimed is:

1. A light emitting device for image display that is disposed in an image display apparatus which displays an image based on image data, the light emitting device for image display comprising:
a light emitting unit that is divided in a plurality of areas and each of a plurality of light emitting elements configured to emit light in accordance with a current supplied is disposed corresponding to each of the areas; and
a Pulse-Width-Modulation (PWM) control portion that applies PWM control to the current supplied to the light emitting element;
the light emitting device for image display uses the light emitting element to emit light that is used for display of the image;
the light emitting device for image display includes:
a control condition setting portion that decides and sets, in an updatable manner, a PWM limit condition and a reference current value in accordance with an Average Picture Level (APL) of the image data;
a PWM value calculation portion that calculates a PWM value for each of the areas based on the image data, the PWM limit condition and the reference current value; and
an LED control signal generation portion which outputs an LED control signal;
wherein
the PWM limit condition is a limit value defining an upper limit value of a sum of the PWM values for the plurality of areas,
the PWM limit condition is a condition which sets a predetermined limitation on a PWM value which is a duty ratio for the PWM control;
the reference current value is a value of a current that flows in the light emitting element in accordance with turning-on of the PWM control;
the PWM control portion performs the PWM control based on the reference current value and the calculated PWM value; and
the LED control signal contains information about the PWM value for each of the areas, the reference current value, and a set LED voltage value to the light emitting unit.

2. The light emitting device for image display according to claim 1, wherein
the control condition setting portion records beforehand reference information that indicates at least one of a relationship between the APL and the limit value and a relationship between the APL and the reference current value; wherein
the control condition setting portion decides the limit value and the reference current value based on the reference information.

3. The light emitting device for image display according to claim 1, wherein
the control condition setting portion updates setting of the limit value and the reference current value substantially concurrently for one of the image data or for every plurality of frames.

4. The light emitting device for image display according to claim 1, wherein
the PWM value calculation portion decides ratios of the PWM values for the respective areas based on the image data; and
performs the calculation in accordance with the decided ratios in such a manner that the sum of the PWM values does not exceed the limit value.

5. The light emitting device for image display according to claim 1, wherein
the light emitting element is an LED.

6. The light emitting device for image display according to claim 5, wherein
when deciding the limit value and the reference current value, the control condition setting portion decides and sets a value as well of a voltage to be applied to the LED in accordance with the reference current value.

7. The light emitting device for image display according to claim 6 in which the light emitting unit is provided with a plurality of the LEDs that emit a plurality of kinds of light colors;
the light emitting device for image display comprises a tint correction portion that corrects the reference current value for each of the colors based on at least one of the reference current value and a detected temperature.

8. The light emitting device for image display according to claim 5 in which the light emitting unit is provided with a plurality of the LEDs that emit a plurality of kinds of light colors;
the light emitting device for image display comprises a tint correction portion that corrects the reference current value for each of the colors based on at least one of the reference current value and a detected temperature.

9. An image display apparatus that displays an image by using the light emitted from the light emitting device for image display according to claim 1.

10. An image display apparatus comprising:
a backlight unit; and
an LCD panel whose light transmittance is adjusted for every pixel based on the image data;
the image display apparatus displays an image on a display region of the LCD panel by giving light from the backlight unit to the LCD panel; wherein
the light emitting device for image display according to claim 1 is used as the backlight unit.

11. The image display apparatus according to claim 10 in which the LCD panel is provided with a plurality of kinds of color pixels;
the image display apparatus comprises a tint correction portion that corrects the light transmittance for each of the colors based on at least one of the reference current value and a detected temperature.

* * * * *